United States Patent [19]
Sartorius et al.

[11] Patent Number: 5,848,436
[45] Date of Patent: Dec. 8, 1998

[54] METHOD AND APPARATUS FOR EFFICIENTLY PROVIDING DATA FROM A DATA STORAGE MEDIUM TO A PROCESSING ENTITY

[75] Inventors: Thomas Andrew Sartorius, Raleigh; Mark Michael Schaffer, Cary, both of N.C.

[73] Assignee: International Business Machines Corporation, Armonk, N.Y.

[21] Appl. No.: 612,631

[22] Filed: Mar. 6, 1996

[51] Int. Cl.$^6$ .............................. G06F 12/00; G06F 12/06
[52] U.S. Cl. ......................... 714/154; 711/118; 711/217; 711/219
[58] Field of Search .................................... 395/403, 411, 395/412, 421.07, 421.09, 445; 711/3, 201, 202, 217, 219, 118, 100, 154

[56] References Cited

U.S. PATENT DOCUMENTS

| | | | |
|---|---|---|---|
| 4,959,779 | 9/1990 | Weber et al. | 711/201 |
| 5,107,415 | 4/1992 | Sato et al. | 395/898 |
| 5,132,898 | 7/1992 | Sakamura et al. | 395/310 |
| 5,313,231 | 5/1994 | Yin et al. | 345/199 |
| 5,395,328 | 3/1995 | Weber et al. | 395/500 |
| 5,519,842 | 5/1996 | Atallah et al. | 711/202 |
| 5,550,987 | 8/1996 | Tanaka | 395/286 |
| 5,574,923 | 11/1996 | Heeb et al. | 395/800.38 |
| 5,630,084 | 5/1997 | Ikumi | 395/376 |
| 5,687,337 | 11/1997 | Carnevale et al. | 395/380 |
| 5,721,957 | 2/1998 | Huang et al. | 395/886 |

OTHER PUBLICATIONS

Microsoft Press Computer Dictionary, p. 418 (Definitions of "word" and word length), 1994.
Prentice Hall's Illustrated Dictionary of Computing, p. 640 (Definition of "word"), 1995.

*Primary Examiner*—Tod R. Swann
*Assistant Examiner*—Conley B. King, Jr.
*Attorney, Agent, or Firm*—Steven B. Phillips; Jenkins & Gilchrist; John D. Flynn

[57] ABSTRACT

A method and apparatus for causing a data line to be fetched in an order consistent with the data structure of a processor's modified little endian mode or big endian mode of operation is accomplished when the processor requests a particular word that is not currently stored in cache memory. The request includes an address of the particular word and an indication is provided as to whether the processor is operating in the modified little endian mode or the big endian mode. A memory manager, upon receiving the request, retrieves a line of data from memory (storage device) based on the address and the mode of operation. For example, when the big endian mode is used, the line of data is retrieved using a target word first ordering and when the modified little endian mode is used, the line of data is retrieved using a reverse target word first ordering.

14 Claims, 7 Drawing Sheets

MODIFIED LITTLE ENDIAN CONVERSION 30

| 32 DATA WORD LENGTH | ADDRESS 34 MODIFICATION |
|---|---|
| 36 - 1-BYTE | XOR 111 |
| 38 - 2-BYTE | XOR 110 |
| 40 - 4-BYTE | XOR 100 |
| 42 - 8-BYTE | NO CHANGE |

FIG. 1
(PRIOR ART)

TARGET WORD FIRST ORDERING

| 52 ADDR. OF REQ. DATA | LINE FILL ADDR. SEQUENCE 54 |
|---|---|
| 00 | 00, 04, 08, 0C, 10, 14, 18, 1C |
| 04 | 04, 08, 0C, 10, 14, 18, 1C, 00 |
| ⋮ | |
| 1C | 1C, 00, 04, 08, 0C, 10, 14, 18 |

32-BYTE DATA LINE
4-BYTE WORD

FIG. 2
(PRIOR ART)

| 102 MODIFIED LITTLE ENDIAN MODE (DECREMENT A29:31 WITH BORROW) | 96 A27:28 | 90 A29:31 | 101 HEX ADDR. SEQ. |
|---|---|---|---|
| | 00 | 000 | 00 |
| | 01 | 100 | 0C |
| | 01 | 000 | 08 |
| | 10 | 100 | 14 |
| | 10 | 000 | 10 |
| | 11 | 100 | 1C |
| | 11 | 000 | 18 |
| | 00 | 100 | 04 |

FIG. 5

| 104 BIG ENDIAN MODE (INCREMENT A29:31 WITH CARRY) | 96 A27:28 | 90 A29:31 | 100 HEX ADDR. SEQ. |
|---|---|---|---|
| | 00 | 000 | 00 |
| | 00 | 100 | 04 |
| | 01 | 000 | 08 |
| | 01 | 100 | 0C |
| | 10 | 000 | 10 |
| | 10 | 100 | 14 |
| | 11 | 000 | 18 |
| | 11 | 100 | 1C |

FIG. 6

METHOD AND APPARATUS FOR EFFICIENTLY PROVIDING DATA FROM A DATA STORAGE MEDIUM TO A PROCESSING ENTITY

TECHNICAL FIELD OF THE INVENTION

This invention relates generally to computer systems and in particular to cache memory system management.

BACKGROUND OF THE INVENTION

As is known, basic computing systems include a processor, a memory manager, memory, cache memory, and interconnecting address, data, and control buses. The memory, which may be volatile (e.g., RAM) or non-volatile (e.g., ROM), stores words which may be program instructions of algorithms or data. When the processor requires a particular word that is not currently stored in the cache, it generates an address and sends it to the memory manager. The memory manager interprets the address to retrieve the requested word and a line of data (i.e., the amount of data a line of the cache memory can hold which may be 4, 8, 16, 32, etc. bytes). The retrieved word is provided to the processor while the line of data is stored in the cache memory.

A unique aspect of these basic computing systems is that the size of a word is generally greater than the size of the smallest addressable unit in the memory. For example, a half word is 16 bits in length, a word is 32 bits in length, a double word is 64 bits in length, while the smallest addressable unit in memory is typically 8 bits (i.e., a byte). To ensure that the appropriate word is being properly retrieved, computing systems utilize byte ordering.

Byte ordering may be in a big endian format or a little endian format. If the big endian format is used, the ordering assigns the lowest address of a memory location to the highest-order 8-bits of a scalar, i.e., a multi-byte entity. The next sequential address in the memory location is assigned to the next highest order 8-bits, and so on. For example, assume that a word (4 bytes) is to be stored in a memory location that occupies hex addresses 00, 01, 02, and 03 of the memory. Assume that the word is AABB-CCDD. As such, AA is the highest order 8-bits of the word, thus this value would be stored in the lowest address of the memory location, which is 00. The next highest order 8-bits of the word is BB, which would be stored in the next lowest address 01. While CC would be stored at address 02 and DD would be stored at address 03.

The little endian format assigns the lowest address to the lowest order 8-bits of the scalar. The next sequential address is assigned to the next lowest 8-bits and so on. Using the above example, but storing the word in a little endian format, the lowest order 8-bits of the word is DD, which would be stored at address 00. The next lowest order 8-bits is CC, which would be stored at the next address 01. Bits BB would be stored at address 02 and bits AA would be stored at address 03.

The PowerPC® microprocessor manufactured by International Business Machines Corporation (IBM) is an example of a computing system that includes the basic architecture described above. The PowerPC processor is designed to operate in the big endian format but may also operate in a modified version of the little endian format. The processor selects which format it will use by controlling bit LE (little endian select). When control bit LE is not set, the big endian format is selected, while, when the control bit LE is set, the modified little endian mode is selected.

When the PowerPC processor is operating in the modified little endian mode, it achieves the effect of little endian byte ordering by modifying the low-order three bits of the effective address (address munge). The modification only affects the addresses presented to a storage subsystem (external memory from the processor), not internal registers such as current instruction address register and next instruction address register.

The modification is an exclusive-ORing of the last three bits of the effective address with the bit values shown in FIG. 1. As shown, the table 30 includes a data word length field 32 and a corresponding address modification code field 34. For a data word length of one-byte 36, the last three binary digits (bits) of the address are exclusive ORed with the binary number 111. The last three binary digits of the address of a two-byte word 38 are exclusive ORed with the binary number 110; the last three binary digits of the address of a four-byte word 40 are exclusive ORed with the binary number 100; and the eight-byte word 42 has no corresponding address modification code.

The resulting modified effective address is then passed to the storage subsystem and data is transferred to and from the storage locations identified by the modified effective addresses. This modification technique makes it appear to the processor that individual aligned scalars are stored in little endian format, but, in fact, they are stored in a modified little endian format. The only difference is that, within double words, the bytes are stored in a reverse order. As such, the PowerPC processor creates a modified little endian mode to allow a big endian mode processor to transfer data with little endian data structures that have been modified and placed in a big endian system.

Regardless of whether the PowerPC processor is operating in the big endian format or the modified little endian format, FIG. 2 illustrates a data line fill for the cache memory system of the PowerPC processor. The line fill is done in a target word first ordering 54, where the illustration is based on a 32 byte cache line. For each possible requested address 52, the corresponding line fill is shown. For example, if the address 52 of the requested data is 04 (hex), the address sequence 54 of the data line will be 04, 08, 0C, 10, 14, 18, 1C, and 00. If the PowerPC processor is operating in the big endian mode, this sequence maximizes the speed of operation when the processor is processing sequential instructions or data because the next requested word is the next word stored in the data line.

If the PowerPC processor is in the modified little endian mode, data will still be retrieved using the target word first ordering. This causes the PowerPC processor to wait for its next data entity since data is not retrieved in the order that it was requested. For example, if processor is requesting address 00 (hex), the expected sequence of data is 00, 04, 08, 0C, 10, 14, 18, and 1C. When the addresses are munged (i.e., converted to the modified little endian format), the addresses as seen by the memory manager will be 04, 00, 0C, 08, 14, 10, 1C, and 18. But, the data will be retrieved in a target word first order such that the first address retrieved is 04, followed by 08, 0C, 10, 14, 18, 1C, and 00. Thus, the data is being retrieved out of order from the way it was requested, causing the processor to wait.

As one will readily appreciate, when the processor has to wait for data to be accessed, the overall efficiency of the system decreases, thus causing the processor to run slower. In the ever increasing competitive world of processors, increasing the efficiency of a processor is essential. Therefore, a need exists for a method and apparatus that improves processing time by causing a data line to be fetched in an order consistent with either a big endian data structure or with a modified little endian data structure.

BRIEF DESCRIPTION OF THE DRAWINGS

FIG. 1 illustrates a little endian to big endian address conversion chart to produce the modified little endian mode of the PowerPC;

FIG. 2 illustrates a target word first line fill order for a 32-byte data line wherein the data words are four bytes in length;

FIG. 5 illustrates an address generation sequence produced by the circuit of FIG. 4 utilizing the modified little endian mode;

FIG. 6 illustrates an address sequence produced by the circuit of FIG. 4 utilizing the big endian mode;

DETAILED DESCRIPTION OF A PREFERRED EMBODIMENT

Generally, the present invention provides a method and apparatus for causing a data line to be fetched in an order consistent with the data structure of a processor's modified little endian mode or big endian mode of operation. This is accomplished when the processor requests a particular word that is not currently stored in cache memory. The request includes an address of the particular word and an indication is provided as to whether the processor is operating in the modified little endian mode or the big endian mode. A memory manager, upon receiving the request, retrieves a line of data from memory (storage device) based on the address and the mode of operation. For example, when the big endian mode is used, the line of data is retrieved using a target word first ordering and when the modified little endian mode is used, the line of data is retrieved using a reverse target word first ordering. With such a method and apparatus, the efficiency of a processor increases because the retrieved words are being fetched in a manner consistent with the order that the processor is utilizing the words.

Figure 3:
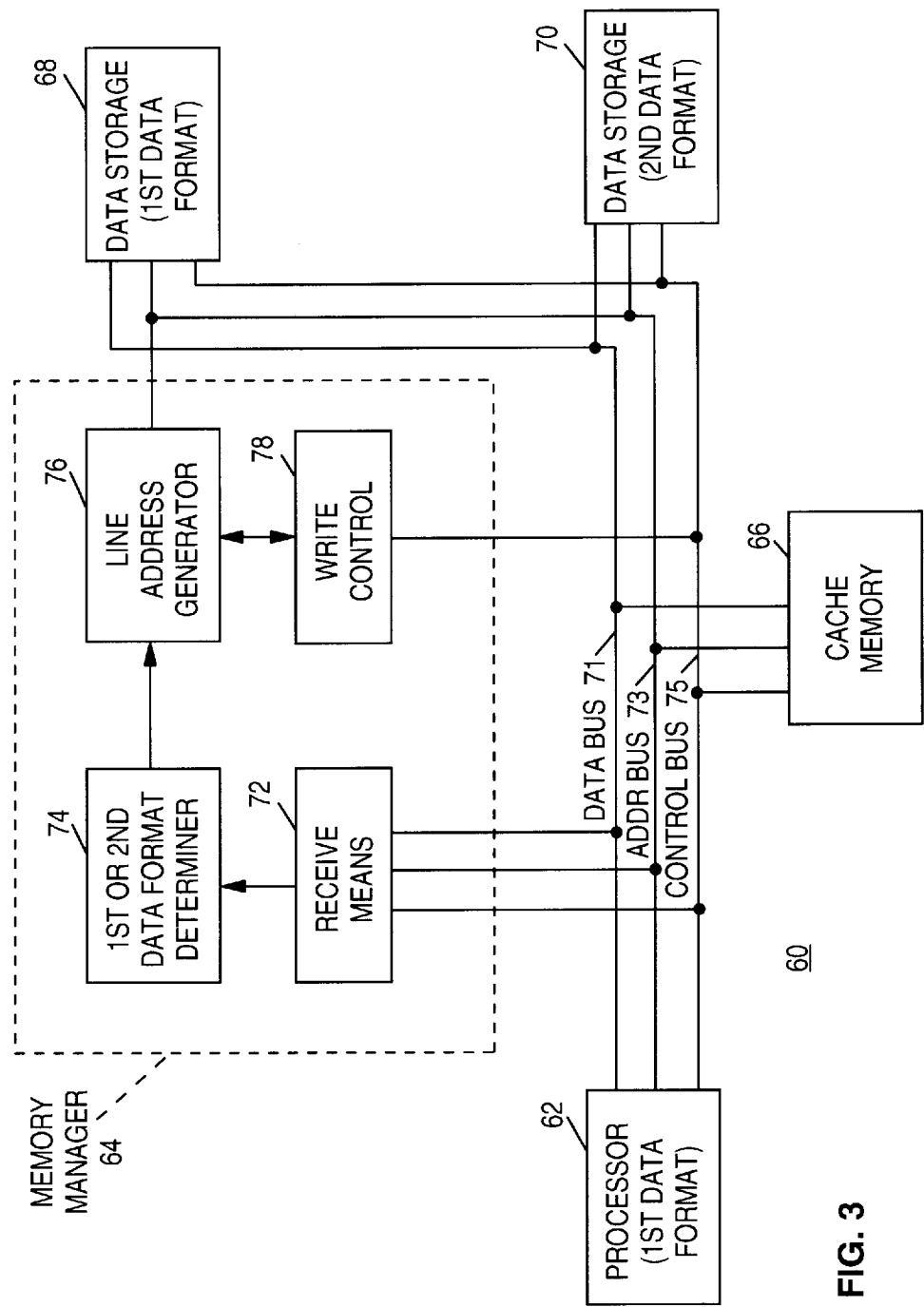
FIG. 3 illustrates a schematic block diagram of a computing system in accordance with the present invention.

The present invention can be more fully described with reference to FIGS. 3–9. FIG. 3 illustrates a schematic block diagram of a computing system 60 in accordance with the present invention. The computing system 60 includes a processor 62, a memory manager 64, cache memory 66, a data storage device using a first data format 68, a second data storage device using a second data format 70, all interconnected via a data bus 71, an address bus 73, and a control bus 75. The memory manager 64 includes a receiving means 72 which, in general, is a bus interface element as known in the art, a first or second data format determiner 74, a line address generator 76, and a write control section 78.

In operation, the processor 62 generates a data request and places it on the address bus 73. The memory manager 64, via the receiving means 72, receives the data request and determines whether the requested data is in the cache memory 66. If so, the requested data is retrieved from the cache memory 66 and provided to the processor 62. If, however, the requested data—where data may be an instruction word, processed data, or any other type of information that the processor can request—is not in the cache memory 66, the memory manager 64 must retrieve it from an external storage device (memory) 68 or 70.

To retrieve data from the data storage, the memory manager first determines whether the LE bit is set via the first or second data format determiner 74. If the LE (little endian) bit is set by the processor 62, the processor 62 is operating in a modified little endian mode. Knowing this, the memory manager 64 then determines the format in which the requested data is stored in the data storage 70. The data storage 70 stores data based on a second data format, which may be the modified little endian format.

Next, the memory manager 64 generates a sequence of addresses, via the line address generator 76, to retrieve a line of data. The sequence of addresses will be generated based on a reverse target word first ordering which will be discussed in greater detail below. The line of data is then stored in the cache memory 66 under control of the write control element 78 which is well known in the art. With the line of data being retrieved in a reverse target word first ordering, the data supplied to the processor operating in a modified little endian mode will be consistent with the order the processor will utilize the data. Thus, the efficiency of the processor will be increased by eliminating wait periods for a line of data to be stored in cache memory.

If the memory manager 64 determines, via the first or second data format determiner 74, that the LE is not set, i.e., the processor 62 is operating in the big endian mode, the line address generator 76 generates a sequence of addresses using a target word first ordering which has been discussed in the background section. The sequence of addresses is used to retrieve a line of data from the data storage device 68 which stores data using a first data format, which may be a big endian format. Once the line of data is retrieved, it is stored in the cache memory.

Figure 4:
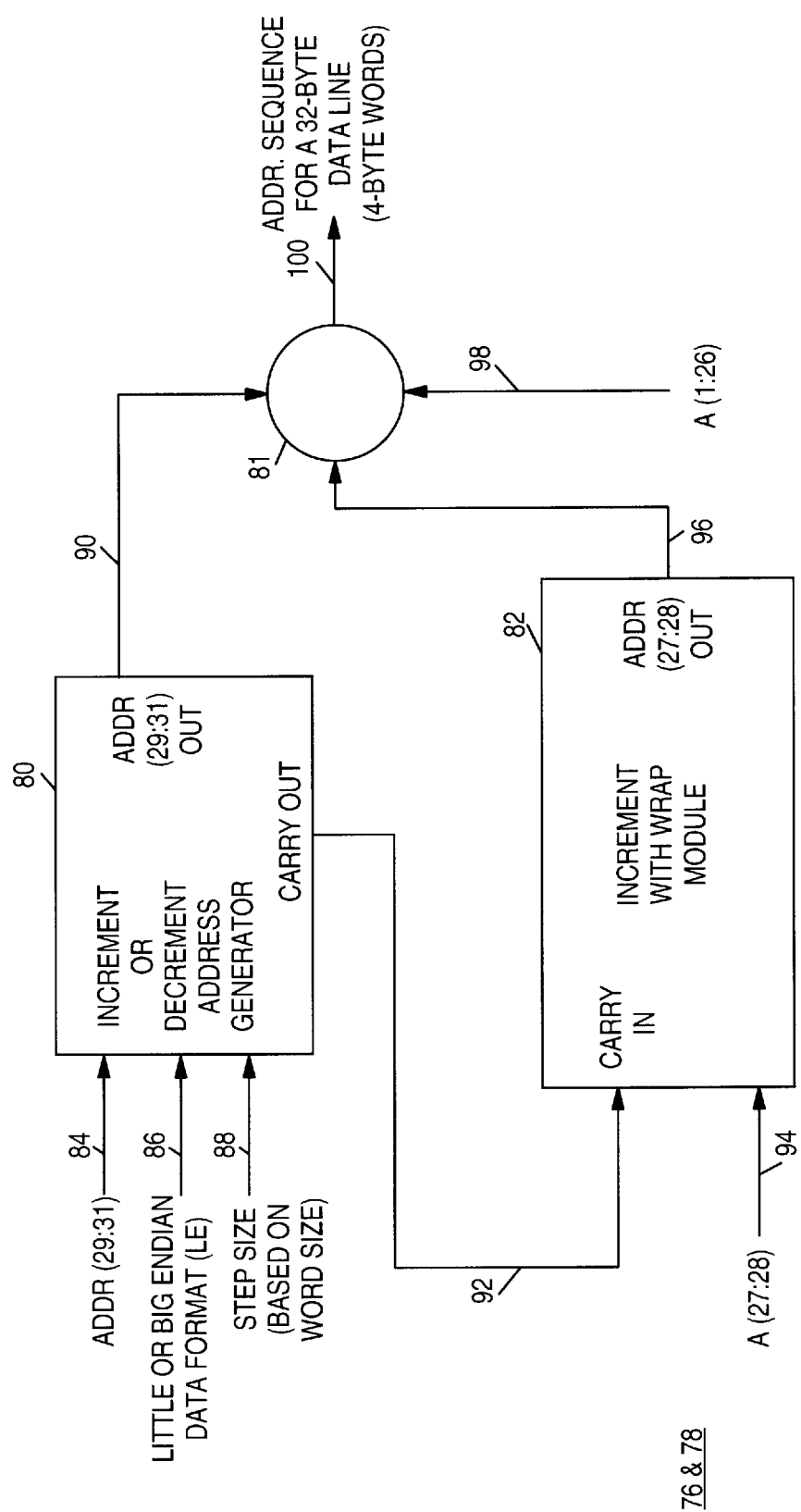
FIG. 4 illustrates a more detailed schematic of the data format determiner and line address generator of FIG. 3.

FIG. 4 illustrates a more detailed schematic block diagram of the first or second data format determiner 74 and the line address generator 76 of the memory manager 64. As shown, these elements include an increment or decrement address generator 80, a concatenation node 81, and an increment with wrap module 82. The address generator 80 performs the function of the first or second format determiner 74 by interpreting a signal on a little endian or big endian data format line (LE) 86. Thus, the signal on this line indicates whether the processor is utilizing a modified little endian format or big endian data format. When in the modified little endian format, the address generator 80 functions in the decrement mode. Conversely, when using the big endian format, the address generator 80 functions in the increment mode.

As shown, the address generator 80 receives the last three binary values of the requested data address via address line 84. In addition, the address generator 80 receives a step size value via a step size line 88 which indicates the increment/decrement step size. This step size is based on the byte size of the words being retrieved which is determined by the bus size of the processor's bus as well as the bus size of the memory device supplying the data. For example, if the byte size is one, the step size is one, if the byte size is two, the step size is two, and so on. The address generator 80, based on these inputs, produces an address output on line 90 and a borrow out on line 92. Note that the binary address bits received by the address generator 80 have already been converted into the proper data format. Thus, the address could be in the modified little endian format (e.g. the processor is operating in the modified little endian modes accessing a data structure that is organized based on the modified little endian mode) or the big endian format (the processor is operating in the big endian mode while accessing a data storage that is organized based on the big endian mode).

The increment wrap module 82 receives the borrow out via line 92, and the 27th and 28th bit of the address via line 94. Given these input values, the increment with wrap module 82 increments the values to produce an address output of the 27th and 28th bit on line 96. A concatenation node 81 combines the 29th–31st address bit with the 27th and 28th address bit and the unchanged address bits 1–26 received on line 98. The resulting output is an address sequence which appears on line 100. In the example given, the data line being generated is 32 bytes in length, and the word length is four bytes, however, one skilled in the art will readily appreciate that both could be of any size with the increment with wrap module 82 inputs being adjusted accordingly.

FIG. 5 illustrates an example 102 of the circuit of FIG. 4 generating an address sequence 101 using a reverse target word first ordering to accommodate the processor when in the modified little endian mode. As shown, address bits 27 and 28 (96), along with address bits 29–31 (90), are shown in conjunction with the resulting hexadecimal address sequence 101. Thus, if the first address received by the memory manager is hexadecimal address 00, the address generator 80, in the decrement mode, will decrement the last three bits, i.e., bits 29–31, of the address to produce the resulting hexadecimal address 0C. Note that in this decrementing mode, there is a wraparound function within a cache line. This wraparound function is based on the byte size of the data line being retrieved for the cache memory. As one skilled in the art will readily appreciate, the byte length of the data line may be any length based on $2^n$, such as 8, 16, 32, 64, etc.

To further illustrate the circuit of FIG. 4, refer to FIG. 5 and assume that the address being requested by the processor is hexadecimal 14. Thus, the binary representation for bits 27 and 28 are 1 0, and the binary representation of bits 29–31 are 1 0 0. The address generator 80 generates the next address in the sequence 10 (hex) by decrementing the binary bits 29–31 to 0 0 0. As can be seen in FIG. 5, regardless of which double word address is initially requested, the address generator 80 can decrement through the sequence to produce the eight hexadecimal addresses, i.e., to produce the different address sequence order.

Figure 7:
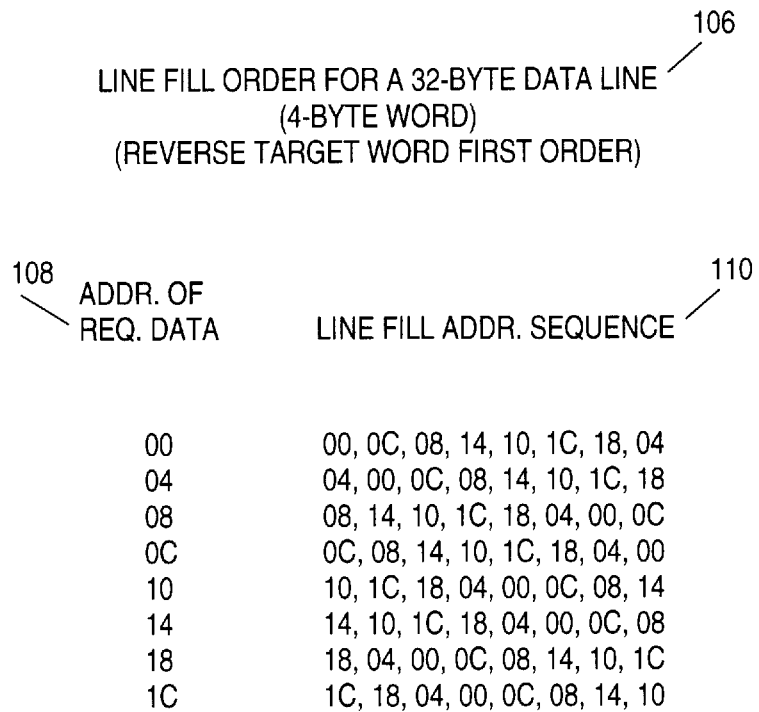
FIG. 7 illustrates a line fill order for a 32-byte data line using reverse target word first ordering in accordance with the present invention.

The general operation of the circuit of FIG. 4, when generating the address sequence using the reverse target word first ordering, can be described as follows. Beginning with the address of the requested data, the address is decremented until the beginning of a double word is reached. At this point, the double word number is incremented to start at the end of the next double word. Next, the address is decremented until the beginning of the next double word is reached, wherein incrementing of the double word number and decrementing of the address are repeated until the beginning of the last double word in the line is reached. At this point, the double word number is wrapped back to the beginning of the line, starting at the end of the first double word. Next, the address is decremented until the beginning of this double word. The process of incrementing the double word number and decrementing the address until the beginning of the next double word continues until the line is finished. FIG. 7, below, will provide an illustrative example of the reverse target word ordering line fill.

FIG. 6 illustrates the circuit of FIG. 4 generating an address sequence 100 using a target word first ordering to accommodate a processor operating in the big endian mode. To generate this address sequence 100, the address generator 80 increments the binary address bits 29–31 with a carry function. As shown, if the address being requested by the processor is hexadecimal 00, wherein bits 27–31 are represented by 0s, the address generator 80 increments this value by a step of four (which equates to the four-byte word size) to produce the next hexadecimal address 04. Referring to the hexadecimal address sequence column 100, it is shown that the big endian increment mode proceeds in a sequential order which has been incremented by four.

As a general operational discussion of the target word first ordering, consider the following. Given the address of the requested data, the address is incremented until the end of the double word is reached. At this point, the double word number is incremented to the beginning of the next double word and the address is again incremented until the end of the cache line. Next, the address is wrapped back to the beginning of the cache line, then it is incremented until the address of the requested data is reached.

FIG. 7 illustrates the cache line fill order for a 32-byte data line 106 using the reverse target word first ordering, wherein the data words are four bytes in length. As shown, the address of the requested data 108 has a particular line fill address sequence 110. For example, if the address of the requested data is 08, the line fill address sequence 110 will be 08, 14, 10, 1C, 18, 04, 00, and 0C. Note that within a double word (e.g. 08, 0C) the address has been decremented until the beginning of the double word has been reached (eg. 08). The double word number is then incremented (eg. 10) and the address is decremented to the beginning of the double word (14, 10). This incrementing and decrementing is continued until the end of the line is reached (eg. 1C, 18). At this point, the address is wrapped back to the beginning of the line, starting with the end of the first double word and decrement to the beginning of the double word (eg. 04, 00). The double word number is now incremented and the address is decremented within the double word until the line is finished (eg. 0C).

Figure 8:
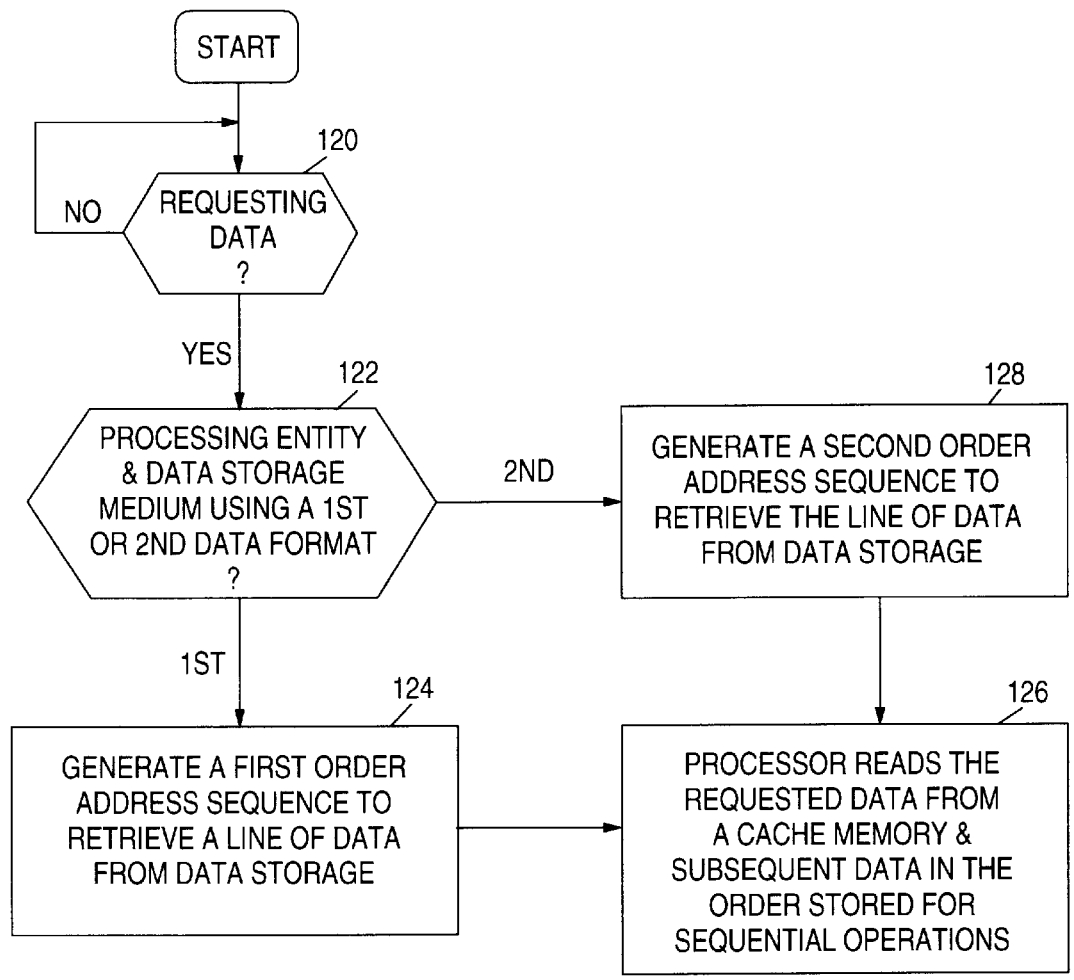
FIG. 8 illustrates a logic diagram that may be used to implement an embodiment of the present invention.

FIG. 8 illustrates a logic diagram which may be used to implement an embodiment of the present invention. The steps shown may be written as program instructions and stored on a processor-readable storage medium such as a computer disk, RAM, ROM, EE PROM, E PROM, or any other means for storing digital information. The process begins at step 120 where a determination is made as to whether data is being requested and the data being requested does not currently reside in the cache memory. When data is requested, the process proceeds to step 122 where a determination is made as to whether a processing entity and a data storage medium—the device that has been identified to be storing the requested data—are using a first data format or a second data format. As mentioned above, the processing entity and data storage medium may use a big endian format or a modified little endian format as used by PowerPC processors.

If the processing entity and the data storage medium use the first data format, the process proceeds to step 124. At step 124, a first order address sequence (eg. generated using a target word first ordering) is generated to retrieve a line of data from the data storage medium. While retrieving this line, sequential accesses by the processor can be satisfied using the retrieved order. Having retrieved the line of data, the process proceeds to step 126 wherein the line of data is stored in cache.

If, however, the processing entity and the data storage medium are using the second data format, the process proceeds to step 128 where a second order address sequence (eg. generated using a reverse target word first ordering) is generated to retrieve the line of data from the data storage medium. Having done this, the process proceeds to step 126 where the processor may access the data.

Figure 9:
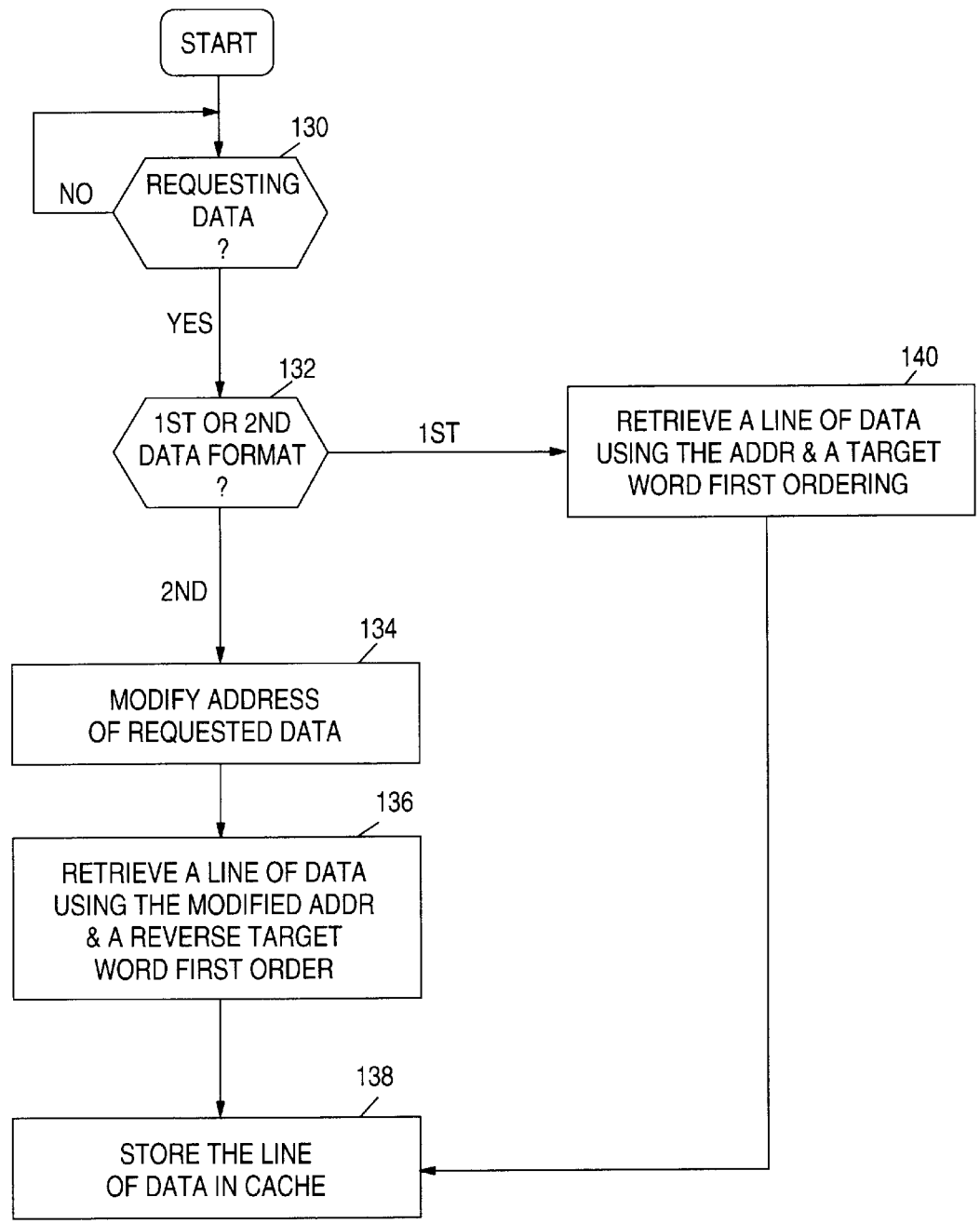
FIG. 9 illustrates a logic diagram that may be used to implement an alternate embodiment of the present invention.

FIG. 9 illustrates a logic diagram that may be used to implement an alternate embodiment of the present invention. The steps of FIG. 9 may be implemented in programming instructions and stored on a processor-readable storage medium. The process begins at step 130 where a determination is made as to whether data is being requested. When data is being requested, the process proceeds to step 132 where a determination is made as to whether a first data format or a second data format is being used. If the first data format is being used, the process proceeds to step 140, where a line of data is retrieved using the address of the requested data and a target word first ordering. After retrieving the data, the process proceeds to step 138 where the line of data is stored in the cache memory.

If, however, the second data format is being used, the process proceeds to step 134. At step 134, the processor modifies the address of the requested data to produce a modified address. Modification of the address may be done as described in the background section with reference to FIG. 1. The process then proceeds to step 136 where a line of data is retrieved based on the modified address and a reverse target word first ordering. The process then proceeds to step 138 where the line of data is stored in the cache memory.

The present invention provides a method and apparatus for more efficient access and storage of data when the processor and data storage device are using a modified little endian data storage format. To achieve the desired efficiency, a line of data is retrieved from the storage device in a manner consistent with an order that the processor needs the data. For example, when in the modified little endian mode, the line of data is retrieved using a reverse target word first ordering, thus presenting the line of data to the processor in the order that improves the efficiency of the processor.

What is claimed is:

1. In a computing system that comprises a processor, cache memory, a cache memory manager, and a data storage element, a method for providing a sequence of data words to the cache memory in an order that improves performance of the processor, the method comprising the steps of:
    a) requesting data from the data storage element, wherein the data is identified by an address;
    b) determining whether a first data format or a second data format is to be used;
    c) when the second data format is to be used, modifying the address based on the second data format to produce a modified address;
    d) when the second data format is being used, retrieving a line of data words from the data storage device utilizing the modified address and a reverse target word first order;
    e) when the first data format is being used, retrieving the line of data words from the data storage utilizing the address and a target word first order; and
    f) storing data elements of the line of data words in the cache memory, wherein a first data element of the line of data words is the requested data.

2. The method of claim 1, wherein step (b) further comprises the step of:
    determining that the first data format is a big endian data format.

3. The method of claim 1, wherein step (b) further comprises the step of:
    determining that the second data format is a modified little endian format.

4. The method of claim 1, wherein step (c) further comprises the step of:
    exclusive ORing last three bits of the address with a bit pattern to produce the modified address, wherein the bit pattern is based on word size of the data.

5. A computing system comprising:
    a processor that uses either a first data format or a second data format, wherein the processor indicates whether the first data format or the second data format is to be used, the processor having a cache in response to a line fill request from the processor;
    cache memory operably coupled to the processor; and
    a memory manager operably coupled to the processor and the cache memory, wherein, the memory manager includes:
        receive means for receiving a data request from the processor;
        determining means for determining whether the data request is for data in the cache memory or in a data storage element;
        line addressing means for generating, when the data is in the data storage element, a first addressing order for a line of data words using a target word first ordering when the request is for data in the first data format and generating a second addressing order for the line of data words using a reverse target word first ordering when the request is for data in the second data format; and
        write control means for causing the line of data words to be stored in the cache memory.

6. The computing system of claim 5, wherein the processor further comprises address modifying means for modifying an address of the data when the data request is of the second data format.

7. The computing system of claim 5, wherein the line addressing means further functions to:
    increment, by an offset, an address corresponding to the data in the first data format to produce the first addressing order; and
    decrement, by the offset, a modified address corresponding to the data in the second data format to produce the second addressing order.

8. A digital storage medium for storing program instructions that, when read by a computing entity, causes the computing entity to efficiently provide data from a data storage medium to a processor, the digital storage medium comprises:
    first storage means for storing program instructions that cause the computing entity to receive a data request from the processor, wherein the data request includes an address corresponding to requested data and wherein the processor indicates whether a first data format or a second data format is to be used;
    second storage means for storing program instructions that cause the computing entity to determine whether the processor and the data storage medium are utilizing the first data format or the second data format;

third storage means for storing program instructions that cause the computing entity to generate a first order address sequence to retrieve a line of data from the data storage medium when the processor and the data storage medium are utilizing the first data format; and fourth storage means for storing program instructions that cause the computing entity to generate a second order address sequence to retrieve the line of data from the data storage medium when the processor and the data storage medium are utilizing the second data format.

9. The digital storage medium of claim 8, wherein the fourth storage means further functions to:

store program instructions that cause the computing entity to convert the address corresponding to requested data into a modified address; and store program instructions that cause the computing entity to utilize a reverse target word first ordering to identify remaining addresses of the second order address sequence.

10. A method for efficiently retrieving from an external storage device a data line comprising a sequence of data words and providing the data line to a processor, the method comprising:

receiving a request for the data line from the processor;

determining whether the data line is stored in a first data format or a second data format;

if the first data format is used, generating a first sequence of addresses for the data line using a target word first ordering and retrieving the data line from the external storage device in accordance with the first sequence of addresses and the target word first ordering; and if the second data format is used, generating a second sequence of addresses for the data line using a reverse target word first ordering and retrieving the data line from the external storage device in accordance with the second sequence of addressing and the reverse target word first ordering.

11. The method of claim 10, wherein the first data format is big endian mode.

12. The method of claim 10, wherein the second data format is modified little endian mode.

13. The method of claim 10, wherein the determining step further comprises interpreting a data format indicator by the processor, wherein the data format indicator indicates the first data format or the second data format.

14. The method of claim 10, further comprising storing the data line in cache memory after it is retrieved.

* * * * *